United States Patent [19]

Parker et al.

[11] Patent Number: 5,451,075
[45] Date of Patent: Sep. 19, 1995

[54] CLOSURE FOR AN AIR BAG ASSEMBLY

[75] Inventors: Thomas Parker, Strafford; Lawrence R. Nichols, Dover; Peter J. Iannazzi, Hampstead, all of N.H.

[73] Assignee: Davidson Textron Inc., Dover, N.H.

[21] Appl. No.: 267,257

[22] Filed: Jun. 29, 1994

[51] Int. Cl.⁶ .......................................... B60R 21/16
[52] U.S. Cl. ................................. 280/728.3; 16/225
[58] Field of Search ............... 280/728 B, 728 R, 732; 403/291; 16/225, 277

[56] References Cited

U.S. PATENT DOCUMENTS

| | | | |
|---|---|---|---|
| 3,640,546 | 2/1972 | Brawn | 280/732 |
| 4,629,596 | 12/1986 | Coffman | 264/171 |
| 4,705,708 | 11/1987 | Briggs et al. | 428/35 |
| 4,836,576 | 6/1989 | Werner et al. | 280/731 |
| 4,852,907 | 8/1989 | Shiraki et al. | 280/731 |
| 4,952,351 | 8/1990 | Parker et al. | 264/46.4 |
| 5,013,064 | 5/1991 | Miller et al. | 280/731 |
| 5,046,758 | 9/1991 | Rafferty et al. | 280/732 |
| 5,082,310 | 1/1992 | Bauer | 280/732 |
| 5,121,942 | 6/1992 | Warnick et al. | 280/728 B |
| 5,131,678 | 7/1992 | Gardner et al. | 280/732 |
| 5,154,444 | 10/1992 | Nelson | 280/732 |
| 5,215,330 | 6/1993 | Kurita | 280/728 |
| 5,280,947 | 1/1994 | Cooper | 280/728 B |
| 5,292,151 | 3/1994 | Parker | 280/732 |
| 5,316,335 | 5/1994 | Gray et al. | 280/728 B |
| 5,335,937 | 8/1994 | Uphues et al. | 280/728 B |

FOREIGN PATENT DOCUMENTS

| | | | |
|---|---|---|---|
| 122753 | 5/1989 | Japan . | |
| 4078637 | 3/1992 | Japan | 280/728 B |

*Primary Examiner*—Mitchell J. Hill
*Assistant Examiner*—Paul N. Dickson
*Attorney, Agent, or Firm*—Reising, Ethington, Barnard & Perry

[57] ABSTRACT

A closure for an air bag assembly includes a flexible outer skin and a layer of foam material covering a retainer member having an air bag deployment opening therein closed by a moveable door that is overlapped with the retainer member to support the door against movement inwardly of the retainer member while providing free hinging movement thereof with respect to the retainer member for stressing and separating the layer of foam and the outer skin for forming a deployment path therethrough for the air bag.

9 Claims, 4 Drawing Sheets

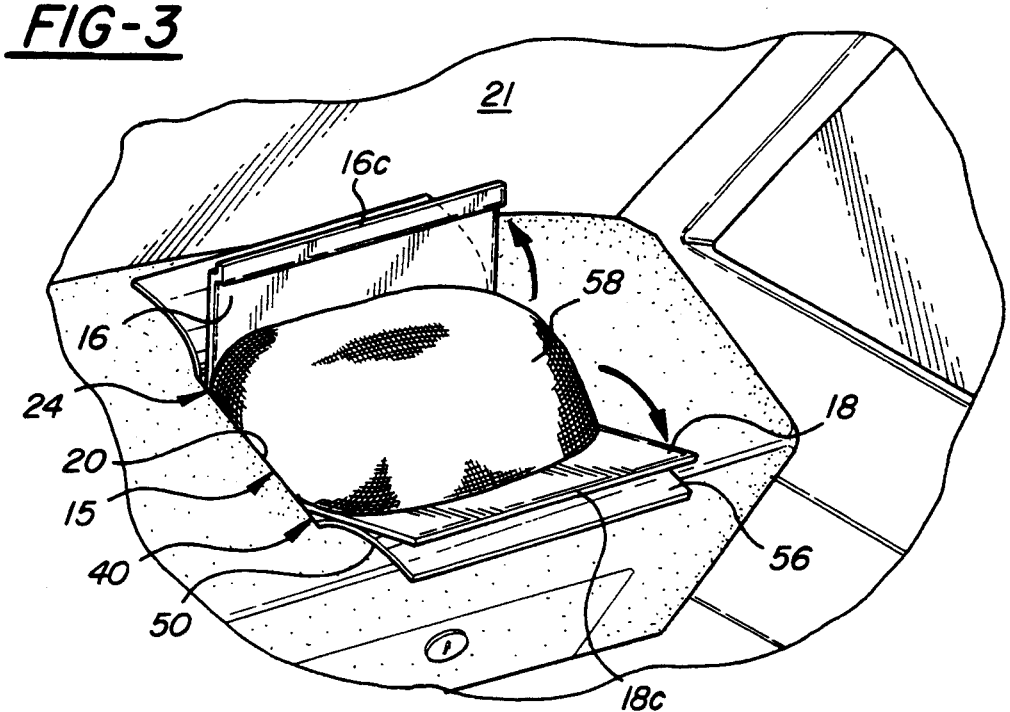
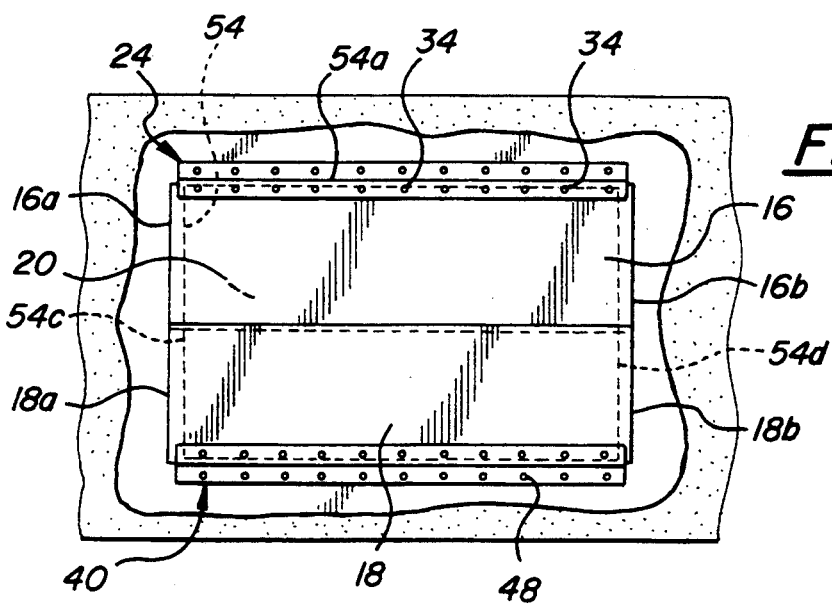
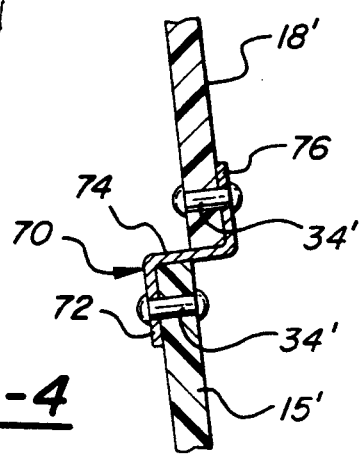

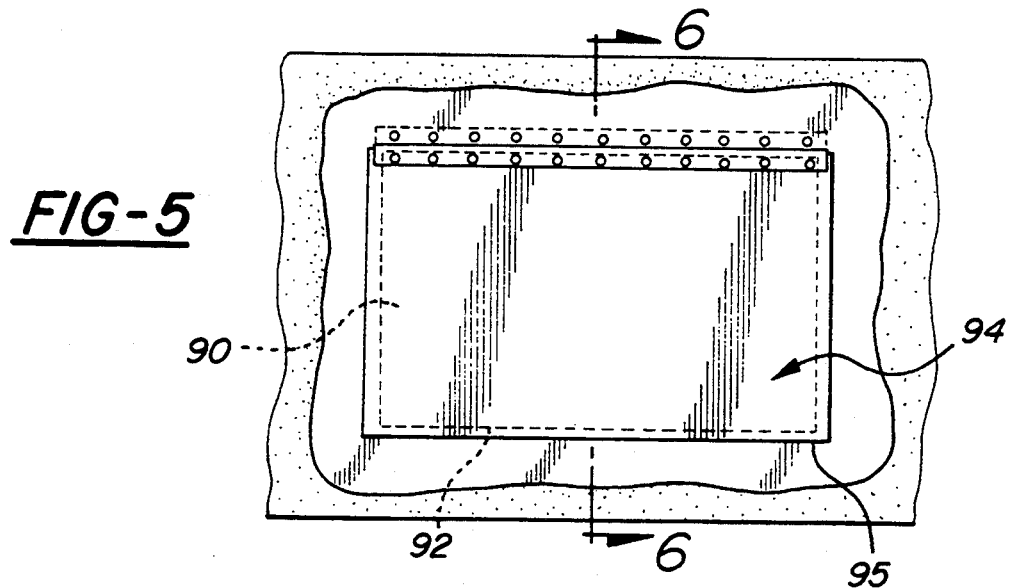
*FIG-5*
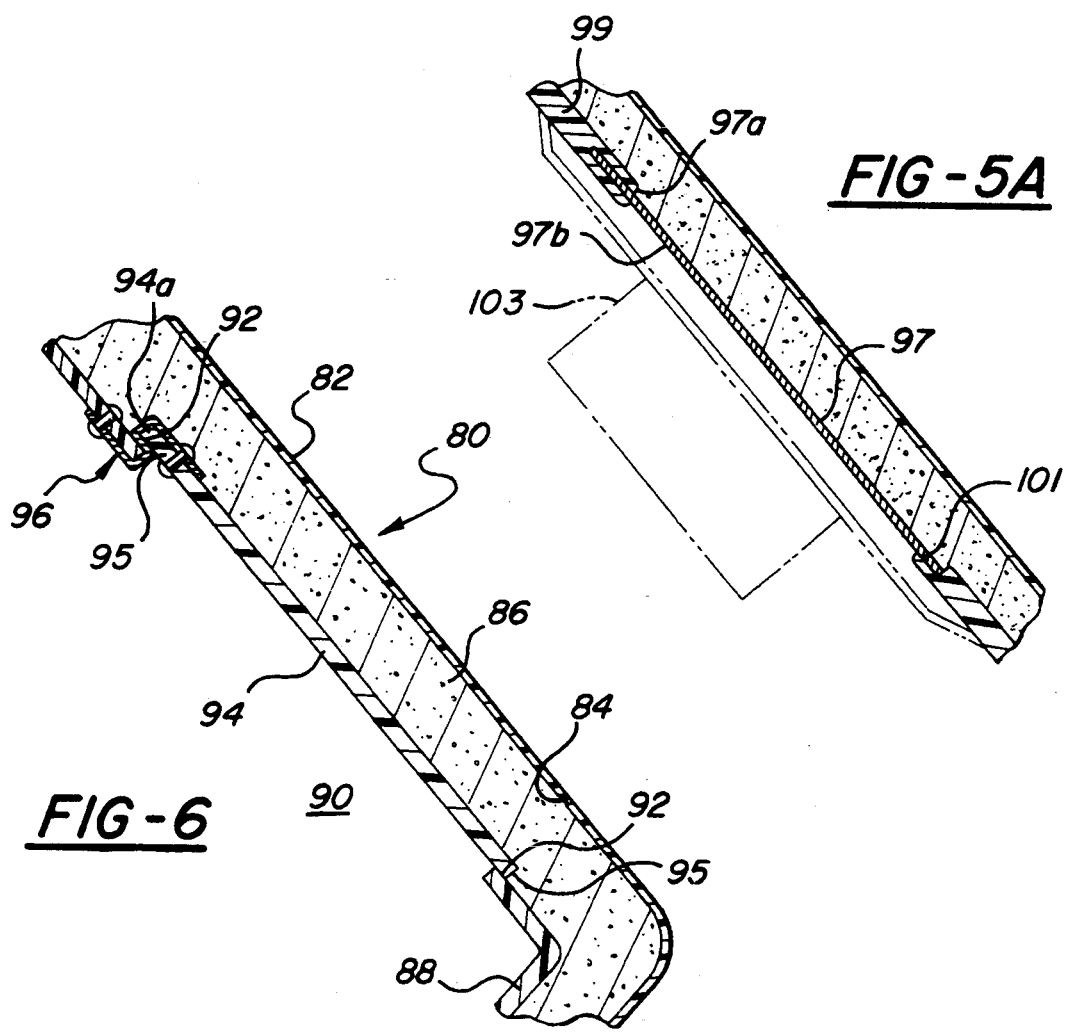
*FIG-5A*
*FIG-6*

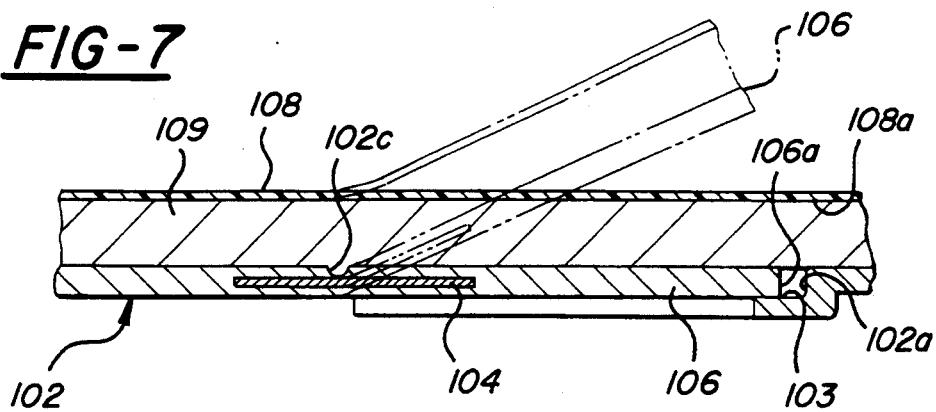
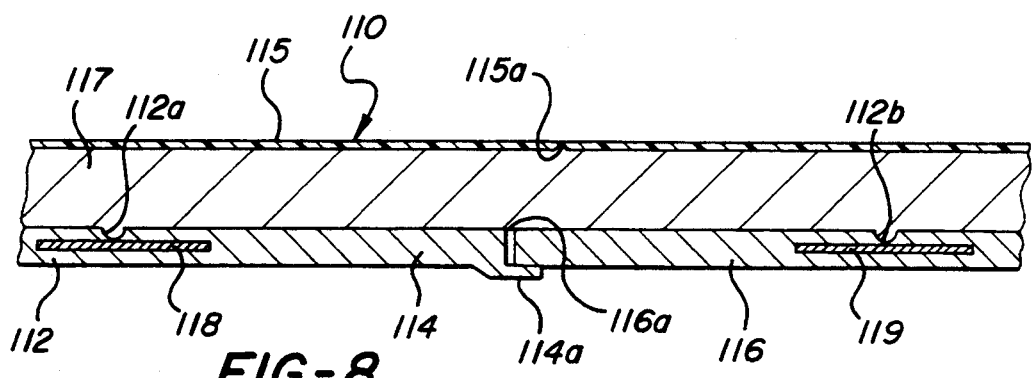
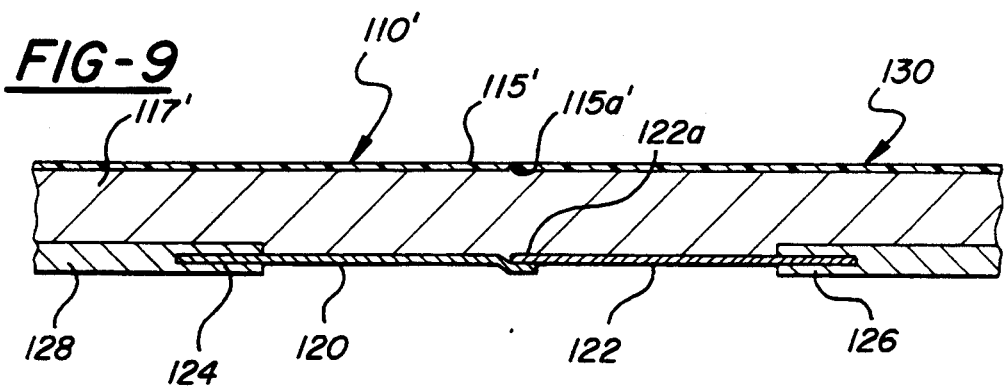
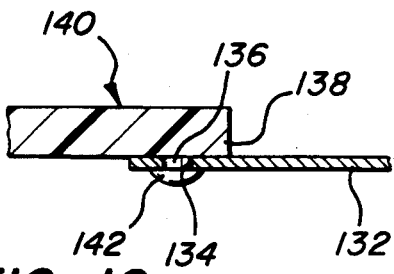
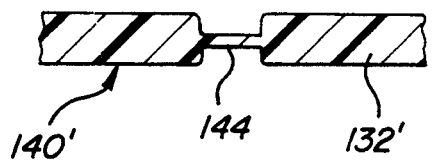

5,451,075

CLOSURE FOR AN AIR BAG ASSEMBLY

BACKGROUND OF THE INVENTION

1. Field of the Invention

This invention relates to closures for air bag assemblies and more particularly to such closures that include at least one movable door that closes an air bag deployment opening and is acted upon by an inflatable air bag to stress and separate a layer of foam and a flexible outer skin for forming a deployment path for the air bag.

2. Description of the Prior Art

Closures for air bag assemblies include those with a covering of smooth material such as polyvinyl chloride that is backed with a foam layer to form a soft cover for an air bag assembly that will hide door members that swing open when the air bag is deployed. Examples of such air bag assemblies are set forth in U.S. Pat. No. 4,852,907 which has unconnected door components that can be moved inwardly of the closure when an inwardly directed force is imposed by an occupant on the outer surface of the closure, for example if there is a head impact thereon or if hand or finger pressure is applied upon the outer surface. U.S. Pat. No. 5,046,758 discloses a hidden seam closure for an air bag assembly having a cutter for freeing a deployment door. U.S. Patent No. 4,952,351 shows a door that is molded in the top surface of an instrument panel but it has an observable seam line.

Other closures of this type such as shown in U.S. Pat. Nos. 5,082,310 and 3,640,546 provide a physical connection between the door members to prevent inward collapse through the retainer member. While suitable for their intended purpose such closures, such interconnection can increase the resistance to door opening movement which in turn can decrease the ability of the air bag to freely deploy once activated in response to vehicle impact.

Still other closures of this type such as shown in U.S. Pat. Nos. 5,131,678 and 5,215,330 an overlap feature to prevent inward deflection of the door member or members of the closure. While such closures avoid the drawback of an interconnection, the particular arrangements disclosed in these patents are not entirely satisfactory. For instance the single door arrangement shown in U.S. Pat. No. 5,131,678 has an observable seam line. On the other hand the double door arrangement shown in U.S. Pat. No. 5,215,330 does not provide any support for the underlying door member.

SUMMARY OF THE INVENTION

An object of the present invention is to provide a closure of the hidden seam line type for an air bag assembly with a door that opens freely with respect to a retainer member when an air bag is activated so as to stress and separate covering material for forming an opening therein for deployment of an air bag therethrough when the air bag is inflated in response to a vehicle impact.

A further object of the present invention is to provide a closure of the hidden seam line type for an air bag the closure having an outer layer of polymeric material, a foam layer underlying the outer layer and an inner retainer member carrying the foam layer and the outer layer in overlying relationship to the air bag deployment opening in the retainer member and a moveable door freely moveable with respect to the retainer member in a direction outwardly thereof and the door member having sides thereof overlapping the retainer member to support the moveable door member against movement thereof inwardly of the retainer member.

A further object of the present invention is to provide a closure of the hidden seam line type for an air bag deployment opening, the closure having an outer layer of polymeric material, a foam layer located within the outer layer and an inner retainer member carrying the foam layer and the outer layer in overlying relationship to the air bag deployment opening and the inner support layer including a moveable door having an end portion integrally joined to the retainer member and a metal insert embedded in the retainer member and in the end portion of the moveable door; the retainer member having a depression formed therein at the metal insert to enable the moveable door to pivot inwardly of the foam in the direction of the outer layer upon deployment of an air bag through the air bag deployment opening so as to stress and separate the foam and the outer layer for forming an air bag deployment path therethrough.

A still further object of the present invention is to provide a closure of the hidden seam line type for an air bag the closure having an outer layer of polymeric material, a foam layer located within the outer layer and an inner retainer member having a deployment opening for the air bag and the retainer member carrying the foam layer and the outer layer in overlying relationship to the air bag deployment opening and the inner retainer member including a moveable door formed as two door segments each having first and second opposite ends; the first opposite ends being pivotally hinged to the inner retainer member and the second opposite ends being overlapped to support the moveable door member against movement inwardly of the inner retainer member in response to loading imposed upon the outer layer of polymeric material.

Another object of the present invention is to provide a closure of the hidden seam line type for an air bag, the closure having an outer layer of polymeric material, a foam layer located within the outer layer and an inner retainer member having an air bag deployment therein and the retainer member carrying the foam layer and the outer layer in overlying relationship to the air bag deployment opening and the inner retainer member including a moveable door member having a first end hinged to the inner retainer member and having a second end and first and second sides overlapping the retainer member to support the moveable door member against movement inwardly of the retainer member in response to loading imposed upon the outer layer of polymeric material.

Yet another object of the present invention is to provide a closure of the hidden seam line type for an air bag, the closure having an outer layer of polymeric material, a foam layer located within the outer layer and an inner retainer member with an air bag deployment therein and carrying the foam layer and the outer layer in overlying relationship to the air bag deployment opening and the inner retainer member supporting a moveable door member including first and second door segments; each of the first and second door segments being freely moveable outwardly of the inner retainer member and each of the first and second door segments including a first end and a hinge for pivotally connecting the first end to the inner retainer member; the first and second door segments each having a second end and first and second sides; the second ends overlapping one another and the first and second sides each overlapping the inner retainer member at a support ledge thereon to support the moveable door member against movement thereof inwardly of the retainer member in response to loading imposed upon the outer layer of polymeric material.

Another object of the present invention is to provide a closure of the hidden seam line type for an air bag the closure having an outer layer of polymeric material, a foam layer located within the outer layer and an inner retainer member carrying the foam layer and the outer layer in overlying relationship to the air bag deployment opening and the inner retainer member supporting a moveable door member having sides overlapping the inner retainer member for supporting the door member against movement thereof inwardly of the inner retainer member in response to external loading imposed on the outer layer.

A feature of the present invention is to provide a closure as set forth in the preceding objects having a hinge that connects the overlapping sides and is connected to the inner retainer member for pivotally connecting the door member to the inner retainer member.

Another feature of the present invention is to provide a closure as set forth in the preceding objects wherein the hinge is s-shaped and includes a central segment covering the inner retainer member and the movable door at the overlap therebetween.

Another feature of the present invention is that the door is configured to have a single side thereof hinged to the inner retainer member and further being configured to have all other sides thereof located in overlapping relationship with the retainer member to form a support that prevents movement of the door inwardly of the retainer member without restricting free movement of the door from its supported position on the inner retainer member outwardly thereof when the air bag is deployed.

Another feature of the present invention is that the door is formed integrally of the retainer member having a single side thereof embedded within the retainer member to form a hinge between the door and the retainer member and wherein a single side of the door is overlapped with the retainer member to support the door against movement inwardly of the retainer member.

Yet another feature of the present invention is that the door has a metal insert embedded therein and in the inner retainer member to form the hinge between the door member and the inner retainer member.

Still another feature of the present invention is that the door has a hinge formed by metal insert embedded in the door and in the inner retainer member at a grooved segment of the inner retainer member for forming a low resistance hinge that supports the doors against movement inwardly of the retainer member while providing free outwardly directed pivoting movement of the door with respect to the inner retainer member.

BRIEF DESCRIPTION OF THE DRAWINGS

FIG. 3 is a fragmentary perspective view of the closure of FIG. 1 in an open position;

FIG. 3A is an enlarged, partially broken away, top elevational view of the closure of FIG. 1;

FIG. 4 is a fragmentary view of an alternative hinge configuration suitable for use in the closure assembly of FIG. 1;

FIG. 5 is an enlarged fragmentary top elevational view of another embodiment of a closure for an air bag assembly embodying the present invention;

FIG. 5A is a fragmentary sectional view of another embodiment of the invention;

FIG. 6 is a sectional view taken along the line 6—6 of FIG. 5 looking in the direction of the arrows;

FIG. 7 is a fragmentary sectional view of another embodiment of the invention;

FIG. 8 is a fragmentary sectional view of another embodiment of the invention;

FIG. 9 is a fragmentary sectional view of another embodiment of the invention;

FIG. 10 is a fragmentary view of an alternative hinge configuration suitable for use in the closure assemblies of FIGS. 5A, 7, 8 and 9; and FIG. 11 is a fragmentary view of another alternative hinge design suitable for use in the closure assemblies of FIGS. 5A, 7, 8 and 9 embodiment of the invention.

DETAILED DESCRIPTION OF PREFERRED EMBODIMENTS

Figure 1:
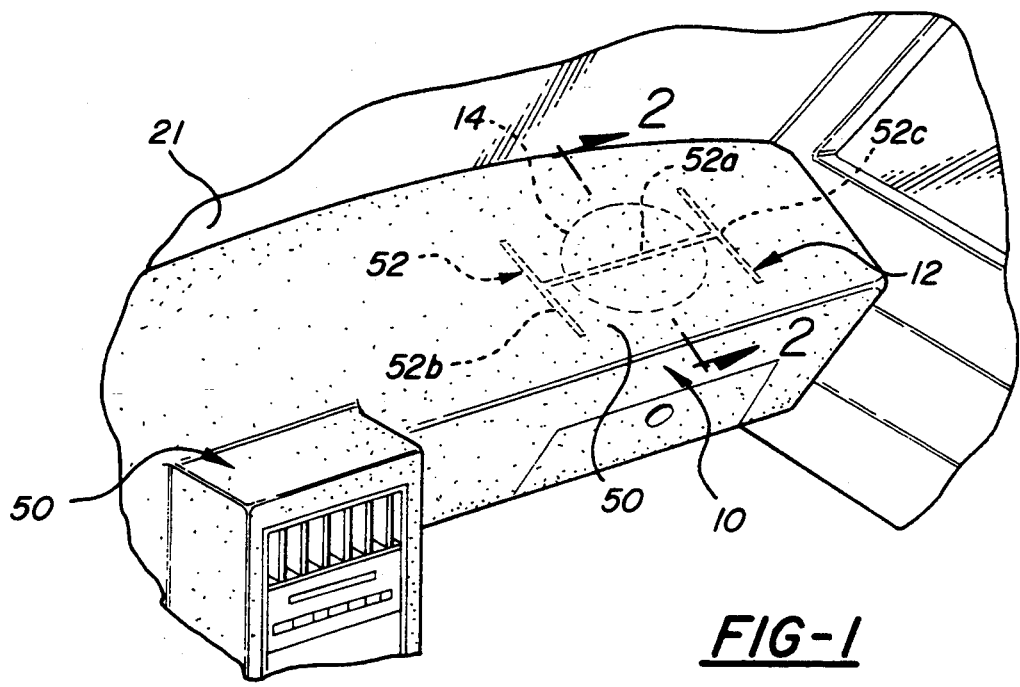
FIG. 1 is a perspective view of a closure for an air bag assembly located within an instrument panel on the passenger side of a motor vehicle.
Figure 2:
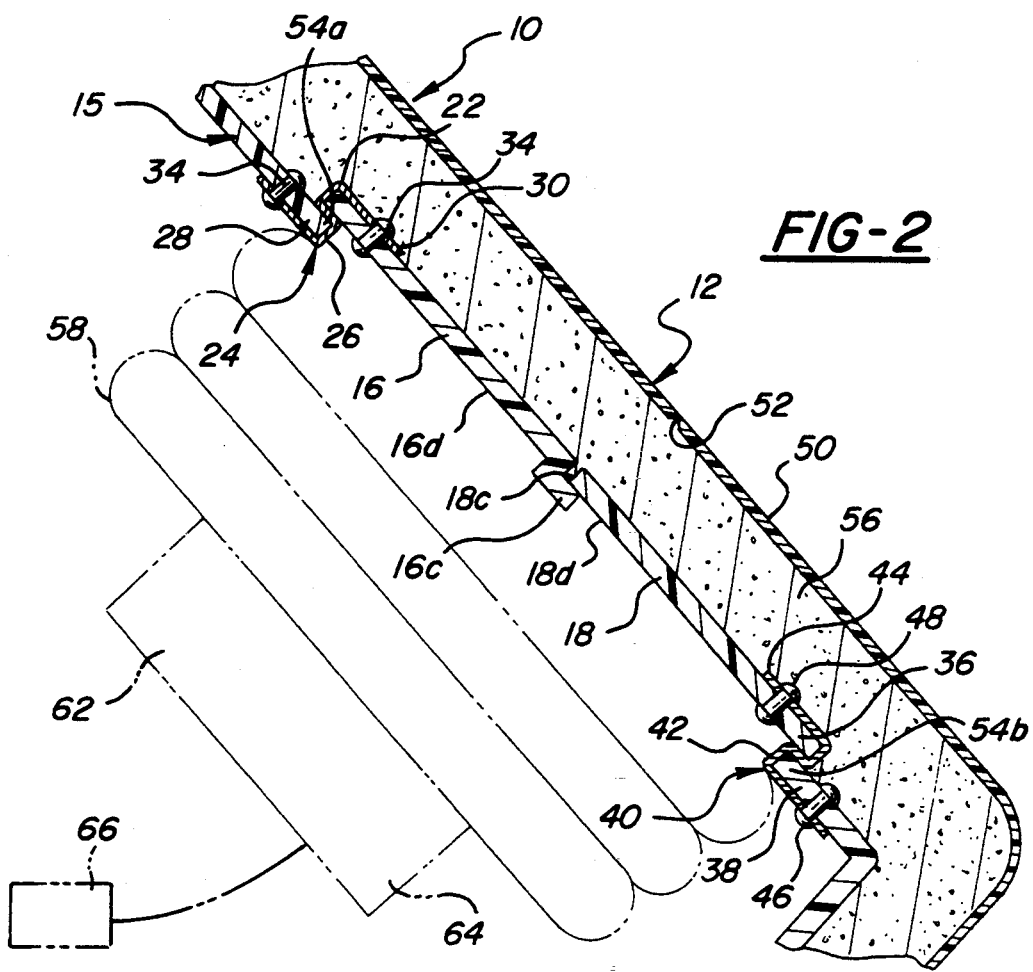
FIG. 2 is an enlarged sectional view taken along the line 2—2 of FIG. 1 looking in the direction of the arrows.

Referring now to FIGS. 1-3, an instrument panel 10 is illustrated having a hidden seam closure assembly 12 that covers an air bag assembly 14 of a known type.

The closure assembly 12 includes an instrument panel retainer 15 that supports two separate doors 16, 18 that cover an opening 20 through the instrument panel retainer 15. The door 16 is located closer to a windshield 21 that is in front of the instrument panel 10. The door 16 includes a forward edge portion 22 that overlaps the retainer 15. An S-shaped hinge 24 has a center segment 26 that covers the forward edge portion 22 and also covers the upper edge 28 of the instrument panel retainer 15. Opposite ends 30 and 32 of the hinge 24 are connected, respectively, to the forward edge portion 22 and the upper edge 28 by a plurality of spaced fastener, representatively shown as a rivet 34 with it being understood that other fasteners such as screws, upset bosses or the like would also be satisfactory for use with the invention.

The door 18 has a rear edge portion 36 thereof located in overlapping relationship with a rear edge portion 38 of the instrument panel retainer 15 at the opposite end of the opening 20. An S-shaped hinge 40 connects the overlapped rear edge portion 38 and rear edge portion 36. The S-shaped hinge 40 has a center segment 42 that covers the rear edge portion 38 and that also covers the rear edge portion 36 of the door 18. Opposite ends 44 and 46 of the hinge 40 are connected, respectively, to the rear edge portions 36, 38 by a plurality of spaced fasteners 48, like fasteners 34.

In accordance with the present invention the closure assembly 12 further includes a flexible outer shell or skin layer 50 preferably formed of a thermoplastic polymer such as polyvinyl chloride, thermoplastic urethane or thermoplastic olefin. The skin layer 50 has a weakened seam 52 formed therein that has an H-shape corresponding to side edges 16a, 16b and 18a, 18b on the doors 18 and the location of the front edge 18c of the door 18. As seen in FIG. 3, the side edges 16a, 16b, 18a and 18b are located in overlapped relationship with a peripheral edge 54 formed on the retainer 15 in surrounding relationship to the opening 20 that is closed by the doors 16, 18. The space between the retainer 15, doors, 16 and 18 and the outer skin layer 50 is filled with a layer of foam material 56 such as urethane foam or polyvinyl chloride foam. The layer of foam material 56 supports the weakened area defined by the weakened seam 52 so as to prevent it from sinking to become visually observable by an occupant. However, in the past it has been difficult to form an underlying support for the foam material 56 that would resist forces imposed on the weakened seam 52 from the outside of the instrument panel or other interior trim assembly for a vehicle embodying a cover assembly for an air bag 58 within the air bag assembly 15.

In order to provide free hinging movement, the doors 16, 18 of the present invention are supported on the retainer and are unconnected either to one another or to the retainer 15. Thus, the doors 16, 18 are supported at an overlap at ledge portions 54a, 54b on the front and rear edges of the periphery 54 of the instrument panel retainer 15. Further, they are supported by an overlap of the side edges 16a, 16b, 18a and 18b with the underlying side ledge portions 54c, 54d of the periphery 54 of the instrument panel retainer 15. Further the front edge 18c of the door 18 is supported by an underlying bent end 16c of the door 16 so as to provide an overlapping configuration between the doors 16 and 18 along the side edges thereof, along the hinged edges thereof and along the abutting edges thereof defined by the front edge 18c and bent end 16c. The present invention thereby provides a support that will resist displacement of the doors 16, 18 inwardly of the instrument panel retainer 15 in a direction toward the air bag 58. The air bag 58 is supported within a housing 60 and it can be provided with a gas generator 62 that is controlled by a control system 64 in response to a signal directed to the control system from a known inertial sensor device 66 when the vehicle is subjected to an impact that requires protection of a vehicle occupant from possible harm.

It should be understood that the present invention is equally suited for use with other inflatable assemblies that are deployable under vehicle impact conditions to protect a vehicle passenger including those systems in which a high pressure charge of inflatant such as nitrogen or any other inert gas is released from a pressure container into the air bag for inflating it into the passenger compartment.

The operation of the illustrated closure assembly 12 includes directing an inflatant into the air bag 58 causing it to engage the inner surface 16d of the forwardly located door 16 and to engage the inner surface 18d of the rearwardly located door 18. The air bag 58 thus forces the doors 16, 18 apart from one another in a swinging movement shown in FIG. 3. The doors 16, 18 move freely from the underlying ledge support portions of the peripheral edge 54 of the instrument panel retainer 15 including the ledge support formed at the hinges 24, 40. Each of the doors 16, 18 pivots about the hinges 24, 40 respectively so that the edge 18c of the forward door will initially compress the layer of foam material 56 while it separates from the ledge support formed by the bent end 16c of the door 16. As the edges 16c, 18c separate, they stress and separate the layer of foam 56 and the outer skin 50 by directing a separating force along the middle segment 52a of the weakened seam 52. At the same time the side edges 16a, 18a act upwardly on the side segments 52b, 52c of the H-shaped to break the skin at those locations. Further swinging movement of the doors 16, 18 causes them to separate both the layer of foam material 56 and the outer skin layer 50 to form an opening generally corresponding to but of slightly greater area than the opening 20 formed in the instrument panel retainer 15 all as shown in the perspective view of FIG. 3.

While the invention is disclosed in association with an instrument panel retainer 15, it is equally suitable for use in a cover assembly for an air bag assembly mounted on a steering column to provide driver side protection. In this case the instrument panel retainer 15 would be replaced by a cover housing of the type set forth in U.S. Pat. No. 5,131,678 commonly assigned with the present application and incorporated herein by reference.

Another embodiment of the present invention is shown in FIG. 4 wherein an alternative hinge design is illustrated. In this embodiment the rear edge of the rear door 18' is located above but to one side of a retainer member 15'. A hinge 70 is provided having an inner end 72 connected to the inner surface of the retainer member 15' by a plurality of spaced fasteners 34', one of which is shown The inner end 72 is connected to a transversely directed segment 74 that is also connected to the outer end 76 of the hinge 70 for connection to the outer surface of the rear door 18' by a plurality of fasteners 34', one shown In this embodiment, there is no ledge support at the hinged side of the door region of the hinge, but the hinge is of reduced cost since it omits the center segment of the S-shaped hinges in the embodiment of FIGS. 1-3. The ledge support at the sides and at the overlap, however, provide sufficient support to prevent inward displacement of the doors in the cover assembly.

Referring now to the embodiment of the invention shown in FIGS. 5 and 6, an overlapped door configuration is shown for use with a cover assembly 80 for an air bag in which the dual door arrangement of FIGS. 1-3 is replaced with a single door that is located below a weakened seam line having a U-shaped configuration. The cover assembly 80 includes an outer skin layer or shell 82 having a U-shaped depression 84 formed in the inner surface thereof to form a weakened seam that will separate readily during deployment of an air bag through the cover assembly 80. The cover assembly 80 further includes a resilient foam layer 86 that underlies the outer skin layer 82 and fills the depression 84 so as to prevent the depression 84 from being visually observable from exteriorly of the cover assembly 80. The cover assembly 80 further includes a interior retainer member 88 having an opening 90 formed therein. The opening 90 is bounded by a ledge surface 92 formed therearound. A single moveable door 94 has a peripheral edge portion 95 that is supported on the ledge surface 92 in overlapping relationship therewith as shown in FIGS. 5 and 6. Accordingly the door 94 is supported against movement thereof interiorly of the cover assembly 80 as was the case of the two door embodiments in FIGS. 1-4.

The front edge 94a of the door 94 is connected by an S-shaped hinge 96 corresponding to the hinge 24 previously described with respect to the embodiments of FIGS. 1-3. As was the case with the previously described embodiment of FIGS. 1-3, this embodiment provides a door for a weakened seam type closure of a supplemental impact restraint system. The door overlaps an interiorly located retainer member such as an instrument panel retainer or a cover member in a driver's side cover assembly of a supplemental impact restraint system. As in the embodiments of FIGS. 1-3, the single door 94 is arranged to have less resistance to opening than the prior art arrangements in which a door is connected by a frangible member to an associated retainer member or to another door for preventing inward displacement of the door from exteriorly of the cover assembly by either finger poking or head impacts.

In all of the embodiments, the doors can be formed from metal such as steel or aluminum. In such case the hinge constructions 24 can be formed as an integrated part of the door retainer. Such a construction is shown in the embodiment of FIG. 5A comprising a metal door 97 having one edge embedded in a molded plastic retainer 99. The front and side edges of the door 97 are rested on a shoulder 101 formed on the retainer. The thinner section door 97 will bend at 97a to provide upward pivotal movement of the door 97 when an air bag is deployed from a canister 103 against the underside surface 97b of the of the door 97.

Alternatively, the doors or door can be made of a suitable plastic material like one of the materials of construction used for the retainer member. In such case the plastic door can be connected to the retainer by a separately assembled hinge made of either steel or aluminum.

Alternatively, the doors or door can be made of such plastic material with the hinge integrated therewith, as described in the embodiment of FIG. 5A.

The cover assembly can be made as follows with it being understood that this proposal is merely representative of one preferred embodiment of the invention. In the case of the single door embodiment of FIGS. 5 and 6, a retainer member is milled to form a through cut on all four sides of an opening. Galvanized metal strap material is formed as a hinge that is either S-shaped as shown in FIGS. 5 and 6 or Z-shaped as shown in FIG. 4. An oversized door is formed to overlap the retainer on all four sides or at least two sides. The hinged end of the oversized door is then connected to the hinge by suitable rivets and metal washers and the hinge is connected to the hinging edge of the retainer side by like rivets and metal washers.

Another cover assembly 100 is illustrated in the embodiment of FIG. 7. In this embodiment a retainer or insert 102 is premolded with a metal insert 104 formed integrally therewith on one side of a integral single door 106 of retainer 102. The single door segment 106 is U-shaped and is spaced from a U-shaped edge 102a of the retainer 102 to be able to swing upwardly in a pivotal movement about the metal insert 104 that bends in a hinging action. The retainer 102 preferably has an U-shaped ledge 103 below the edge 102a for supporting the door segment 106 in the closed position. In order to facilitate the hinging action the preformed retainer 102 includes a depression 102c therein extending along the hinged end of the single door segment at the insert 104. As in the previously described embodiments, the cover assembly 100 includes an outer skin layer or shell 108 having a weakened tear seam 108a formed therein in a U-shape corresponding to that of the outer edge 106a of the single door 106. The space between the retainer 102 and the outer skin layer 108 is filled with a layer of resilient foam material 109. The strength of the metal insert 104 is selected to limit the amount of inward deflection of the door 106 inwardly of the cover assembly 100 when an external force is directed thereagainst, while enabling the door 106 to freely hinge outwardly as shown in hidden broken lines in FIG. 7 so as to stress and separate the layer of foam and outer skin for forming an air bag deployment path.

The embodiment of FIG. 8 is like that of FIG. 7. In this embodiment two integral U-shaped doors are formed in a cover assembly 110. More specifically, the cover assembly 110 includes a retainer or insert member 112 having first and second integral door members 114, 116 each of which are formed integrally with the retainer 112 at a hinged end thereof. Each of the hinged ends is formed in part by a metal insert 118, 119 that underlies a weakened section defined by separate depressions 112a, 112b in the retainer member, respectively overlying the embedded metal inserts 118, 119. The weakened depressions 112a, 112b extend along the width of the hinged end of each of the integral door members 114, 116 to provide for hinging action at the hinged ends of the first and second integral doors during deployment of an air bag through the cover assembly. In order to further prevent inward movement of the doors 114, 116 further support (in addition to that of the inserts 118 at the hinged ends thereof) is provided by an overlap between adjacent ends of the doors 114, 116 as defined by a bent end 114a on the door 114 that is bent inwardly of the doors 114, 116 and arranged to support the underside of the free end 116A of the door 116. As in the previously described embodiments, the cover assembly 110 includes an outer skin layer or shell 115 having a weakened tear seam 115a formed therein in an H-shape corresponding to that of the side edges and free ends of the doors 114,116. The space between the retainer 112 and the outer skin layer 118 is filled with a layer of resilient foam material 117. The strength of the metal inserts 118 is selected to limit the amount of inward deflection of the doors 114, 116 inwardly of the cover assembly 110 when an external force is directed thereagainst.

The embodiment of FIG. 9 is like the embodiment of FIG. 8 except that the doors 114, and 116 and the metal inserts 118 are replaced by two metal doors 120, 122 that are molded in place on the peripheral front and rear edges 124, 126 of the interior retainer 128 of a cover assembly 130 like that shown in the embodiment of FIGS. 1-3. The other components of the cover assembly 130 that are the same as those described in the embodiment of FIG. 8 are designated the same as in the FIG. 8 embodiment but with the reference numerals primed. In the FIG. 9 embodiment, the metal doors 120, 122 are overlapped at their free ends 120a, 122b to provide additional support against inward movement of the insert door structure when external forces are directed against the outer surface of the outer skin layer 115'.

In accordance with the embodiments of the invention shown in FIGS. 5A, 7, 8 and 9, the means to provide support against inward movement of the door components of the cover assembly for a supplemental impact restraint system is characterized as including a thermoplastic or thermoset inner retainer having doors integrally formed with the retainer that open up and bend out of the way to form a deployment path for an air bag to inflate. In order to prevent the doors from collapsing, sagging or deforming, unconnected ledge support is provided in part by the provision of hinge inserts formed integrally of the doors at the hinged ends thereof. In the case of two door members located below a H-shaped weakened hidden seam in a outer skin layer of a cover assembly a overlapping support is provided at the free end of the door members. In accordance with the invention the single door member embodiment can have its free end overlapped by the insert. While the doors in the embodiments of FIGS. 5A, 7, 8 and 9 are integrally formed with the retainer, in FIG. 10 another embodiment is shown in which the doors are preformed with a hinged end 132 that has spaced holes 134 formed therein, one hole illustrated in the section of FIG. 10. The holes 134 are fit over a plurality of spaced plastic bosses 136 at the hinging edge 138 of an insert member 140 and the bosses are upset by a combination of heat and pressure so as to flow over the insert causing it to be partially encapsulated and secured in place to the door insert as shown at 142 in FIG. 10. Yet another variation would be to integrally form the hinged end to the insert by a thin strip of plastic as shown at 144 in FIG. 11, in which corresponding retainer and doors have the same reference numerals as in FIG. 10, but primed. In this case the door 132', in combination with the thin section of thermoplastic material joins the door 132' to the retainer 140' and is operative to bend to form a hinging mechanism about which the door 132' can pivot open during deployment of an air bag through the cover assembly.

While this invention has been shown and described a container for the air bag in its predeployment folded cushion disposition and a cover assembly for the air bag, it should be recognized that the container and retainer can be unitized into one member forming both a housing for the air bag and a retainer component within the cover assembly.

Thus, the present invention provides a supplemental impact restraint system having an air bag hidden by a cover assembly with pivotal doors that are supported against inward movement including collapse, sag or deformation thereof when an external force is imposed on the outer surface of the cover assembly. The invention is further arranged such that the pivotal doors of the cover assembly are unconnected and thereby free to pivot apart within an opening formed within an insert member with the only resistance to such pivoting movement being that of the hinging force and the force required to penetrate through overlying foam material and a weakened seam formed in the outer skin layer or shell of the cover assembly.

Examples of suitable materials for the outer skin layer includes polyvinyl chloride or other thermoplastic materials such as thermoplastic elastomers or thermoplastic olefins.

Examples of suitable foam materials include low modulus elastomers such as reaction injection molded urethane material having a flexural modulus in the range of 20,000–80,000 psi at 75° F. Other comparable urea based or vinyl based foam are equally suitable for use with the invention. The use of inserts with inwardly supported unconnected door or doors can be used with other cover assemblies in which the foam layer is omitted entirely and wherein the cover material is formed by other materials including fabrics (both natural and synthetic), leather and any other material that will provide a desired decorative appearance overlying an air bag assembly.

While the foregoing is a complete description of preferred embodiments of the present invention, it should be understood that various changes and modifications may be made without departing from the spirit and scope of the present invention as set forth in the following claims.

What is claimed is:

1. A closure for an air bag having an outer layer of polymeric material, a foam layer located within said outer layer and an inner retainer member having an air bag deployment opening preformed therein and the inner retainer member carrying said foam layer and said outer layer in overlying relationship to the air bag deployment opening in the inner retainer member and a moveable door said closure characterized by:

said moveable door being formed by two metal door segments each having first and second opposite ends; said first opposite ends being embedded within said inner retainer member and said second opposite ends being overlapped for supporting said moveable door against movement inwardly of said inner retainer member and for supporting said moveable door for free movement thereof from its supported position on said inner retainer member.

2. A closure for an air bag having an outer layer of polymeric material, a foam layer located within said outer layer and an inner retainer member having an air bag deployment opening preformed therein and the inner retainer member carrying said foam layer and said outer layer in overlying relationship to the air bag deployment opening in the inner retainer member and a moveable door said closure characterized by:

said moveable door including first and second door segments; each of said first and second door segments including a first end and a hinge connecting said first end to said inner retainer member; said first and second door segments each having a second end and first and second sides; said second ends overlapping one another and said first and second sides each overlapping said inner retainer member for supporting said moveable door against movement inwardly of said inner retainer member and for supporting said moveable door for free movement thereof from its supported position on said inner retainer member.

3. A closure for an air bag having an outer layer of polymeric material, a foam layer located within said outer layer and an inner retainer member having an air bag deployment opening preformed therein and the inner retainer member carrying said foam layer and said outer layer in overlying relationship to the air bag deployment opening in the inner retainer member and a moveable door said closure characterized by:

said moveable door including a door segment; said door segment including a first side and a plurality of additional sides; a hinge connecting said first side to said inner retainer member and said plurality of additional sides supported on said inner retainer member without connection thereto for supporting said moveable door against movement inwardly of said inner retainer member and for supporting said moveable door for free movement thereof from its supported position on said inner retainer member, said hinge having portions overlapping said moveable door and said inner retainer member, and said hinge being S-shaped and including a central segment covering said inner retainer member and said first side for connecting said hinge to said inner retainer member and said first side 4. The closure set forth in claim 3 further characterized by said s-shaped hinge having end extensions on said central segment and a fastener connecting said end extensions respectively to said door and to said inner retainer member.

5. The closure set forth in claim 3 further characterized by said hinge being formed of metal.

6. A closure for an air bag having an outer layer of polymeric material, a foam layer located within said outer layer and an inner retainer member having an air bag deployment opening preformed therein and the inner retainer member carrying said foam layer and said outer layer in overlying relationship to the air bag deployment opening in the inner retainer member and a moveable door said closure characterized by:

said moveable door including a door segment; said door segment including a first side and a plurality of additional sides; a hinge connecting said first side to said inner retainer member and said plurality of additional sides supported on said inner retainer member without connection thereto for supporting said moveable door against movement inwardly of said inner retainer member and for supporting said moveable door for free movement thereof from its supported position on said inner retainer member, said hinge having portions overlapping said moveable door and said inner retainer member, and further characterized by said hinge being s-shaped and forming an overlap between said inner retainer member and said moveable door.

7. A closure for an air bag having an outer layer of polymeric material, a foam layer located within said outer layer and an inner retainer member having an air bag deployment opening preformed therein and the inner retainer member carrying said foam layer and said outer layer in overlying relationship to the air bag deployment opening in the inner retainer member and a moveable door said closure characterized by:

said moveable door including a door segment; said door segment including a first side and a plurality of additional sides; a hinge connecting said first side to said inner retainer member and said plurality of additional sides supported on said inner retainer member without connection thereto for supporting said moveable door against movement inwardly of said inner retainer member and for supporting said moveable door for free movement thereof from its supported position on said inner retainer member, said hinge having portions overlapping said moveable door and said inner retainer member, and further characterized by said inner retainer member having a plurality of integrally formed bosses; said hinge connected to said inner retainer member by an upset portion of said bosses.

8. A closure for an air bag having an outer layer of polymeric material, a foam layer located within said outer layer and an inner retainer member having an air bag deployment opening preformed therein and the inner retainer member carrying said foam layer and said outer layer in overlying relationship to the air bag deployment opening in the inner retainer member and a moveable door said closure characterized by:

said moveable door including first and second door segments; each of said first and second door segments including a first end and a hinge connecting said first end to said inner retainer member; said first and second door segments each having a second end and first and second sides; said first and second sides each overlapping said inner retainer member for supporting said moveable door against movement inwardly of said inner retainer member and for supporting said moveable door for free movement thereof from its supported position on said inner retainer member.

9. The closure set forth in claim 8 further characterized by said hinge being formed of metal having an end embedded in said first end of said first and second door segments.

* * * * *